US012754199B2

(12) United States Patent
Chino et al.

(10) Patent No.: US 12,754,199 B2
(45) Date of Patent: Oct. 6, 2026

(54) SENSOR MODULE AND ELECTRONIC APPARATUS

(71) Applicant: SEIKO EPSON CORPORATION, Tokyo (JP)

(72) Inventors: Taketo Chino, Hokuto (JP); Masayasu Sakuma, Shiojiri (JP)

(73) Assignee: SEIKO EPSON CORPORATION (JP)

(*) Notice: Subject to any disclaimer, the term of this patent is extended or adjusted under 35 U.S.C. 154(b) by 134 days.

(21) Appl. No.: 18/966,611

(22) Filed: Dec. 3, 2024

(65) Prior Publication Data

US 2025/0189554 A1 Jun. 12, 2025

(30) Foreign Application Priority Data

Dec. 6, 2023 (JP) ................................ 2023-205933

(51) Int. Cl.
*G01P 3/44* (2006.01)
*G01P 1/02* (2006.01)

(52) U.S. Cl.
CPC ................ *G01P 3/44* (2013.01); *G01P 1/026* (2013.01)

(58) Field of Classification Search
CPC .. G01P 1/02; G01P 1/023; G01P 1/026; G01P 3/44; G01P 15/18; G01C 19/56; G01C 19/5621; G01C 19/5719; G01C 19/5733; G01C 19/574; G01C 19/5747; G01C 19/5783
See application file for complete search history.

(56) References Cited

U.S. PATENT DOCUMENTS

2012/0304765 A1 12/2012 Sakuma et al.
2012/0304768 A1 12/2012 Sakuma et al.
2012/0307459 A1 12/2012 Sakuma et al.
2013/0014578 A1 1/2013 Sakuma et al.
2013/0014581 A1 1/2013 Sakuma et al.
2013/0263660 A1* 10/2013 Shibata .................. G01C 19/56 29/25.35
2014/0063753 A1 3/2014 Chino
2017/0191832 A1 7/2017 Kinoshita et al.
2019/0285663 A1 9/2019 Chino et al.
(Continued)

FOREIGN PATENT DOCUMENTS

JP 2012-251801 A 12/2012
JP 2012-251802 A 12/2012
(Continued)

*Primary Examiner* — Huy Q Phan
*Assistant Examiner* — David B Frederiksen
(74) *Attorney, Agent, or Firm* — Harness, Dickey & Pierce, P.L.C.

(57) ABSTRACT

A sensor module includes: a first substrate; a second substrate; a coupling portion that electrically couples the first substrate and the second substrate; a first sensor device provided on the first substrate and configured to detect a physical quantity of a first axis; a second sensor device provided on the first substrate, configured to detect the physical quantity of the first axis, and having a drive frequency different from that of the first sensor device; a third sensor device provided on the second substrate and configured to detect a physical quantity of a second axis; and a fourth sensor device provided on the second substrate and configured to detect the physical quantity of the second axis.

13 Claims, 9 Drawing Sheets

(56) References Cited

U.S. PATENT DOCUMENTS

| | | | | |
|---|---|---|---|---|
| 2021/0123736 | A1* | 4/2021 | Ozawa | G01C 19/5649 |
| 2022/0317146 | A1* | 10/2022 | Otani | G01P 15/18 |

FOREIGN PATENT DOCUMENTS

| | | | |
|---|---|---|---|
| JP | 2012-251803 | A | 12/2012 |
| JP | 2013-019745 | A | 1/2013 |
| JP | 2013-019825 | A | 1/2013 |
| JP | 2014-048090 | A | 3/2014 |
| JP | 2017-020829 | A | 1/2017 |
| JP | 2019-163955 | A | 9/2019 |
| JP | 2019-203904 | A | 11/2019 |

* cited by examiner

SENSOR MODULE AND ELECTRONIC APPARATUS

The present application is based on, and claims priority from JP Application Serial Number 2023-205933, filed Dec. 6, 2023, the disclosure of which is hereby incorporated by reference herein in its entirety.

BACKGROUND

1. Technical Field

The present disclosure relates to a sensor module and an electronic apparatus.

2. Related Art

JP-A-2019-163955 describes a sensor module that achieves high accuracy of X-axis angular velocity data by mounting two X-axis angular velocity sensor devices on side surfaces of the same substrate.

JP-A-2019-163955 is an example of the related art.

In a sensor module including a plurality of sensor devices for one detection axis, further improvement in effectiveness and reliability of high accuracy is desired.

SUMMARY

A sensor module according to an aspect of the present application includes: a first substrate; a second substrate; a coupling portion that electrically couples the first substrate and the second substrate; a first sensor device provided on the first substrate and configured to detect a physical quantity of a first axis; a second sensor device provided on the first substrate, configured to detect the physical quantity of the first axis, and having a drive frequency different from that of the first sensor device; a third sensor device provided on the second substrate and configured to detect a physical quantity of a second axis; and a fourth sensor device provided on the second substrate, configured to detect the physical quantity of the second axis, and having a drive frequency different from that of the third sensor device.

A sensor module according to an aspect of the present application includes: a first substrate; a second substrate; a third substrate; a first coupling portion that electrically couples the first substrate and the second substrate; a second coupling portion that electrically couples the first substrate and the third substrate; a first sensor device provided on the first substrate and configured to detect a physical quantity of a first axis; a second sensor device provided on the first substrate, configured to detect the physical quantity of the first axis, and having a drive frequency different from that of the first sensor device; a third sensor device provided on the second substrate and configured to detect a physical quantity of a second axis; a fourth sensor device provided on the second substrate, configured to detect the physical quantity of the second axis, and having a drive frequency different from that of the third sensor device; a fifth sensor device provided on the third substrate and configured to detect a physical quantity of a third axis; and a sixth sensor device provided on the third substrate, configured to detect the physical quantity of the third axis, and having a drive frequency different from that of the fifth sensor device.

An electronic apparatus according to an aspect of the present application includes: the sensor module described above.

DESCRIPTION OF EMBODIMENTS

Figure 1:
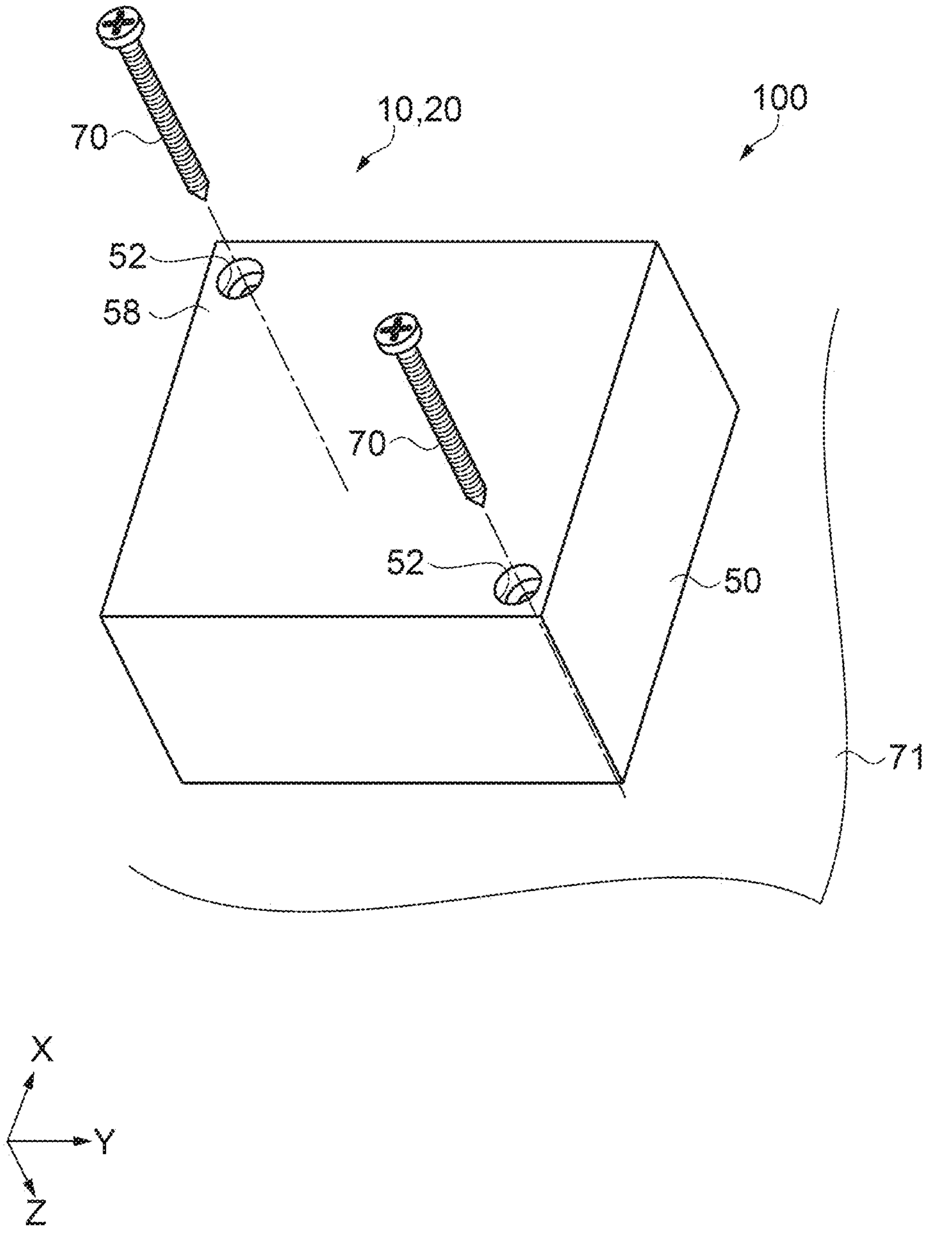
FIG. 1 is a perspective view illustrating a state in which a sensor module according to Embodiment 1 is fixed to a mounting surface.

In drawings, elements are drawn at different dimensional scales in some cases for clarity of the elements.

In the drawings, the X axis, the Y axis, and the Z axis are perpendicular to one another.

In the following description, the "X-axis direction" indicates a direction parallel to the X axis, the "Y-axis direction" indicates a direction parallel to the Y axis, and the "Z-axis direction" indicates a direction parallel to the Z axis.

In the following description, the "positive side" indicates a tip end side of an arrow direction of each of the X, Y, and Z axes, and the "negative side" indicates an end side of the arrow direction.

In the following description, the "plan view" refers to a view from the Z-axis direction with respect to a plane including the X axis and Y axis.

In the following description, the upper surface of a certain configuration indicates a surface of the configuration on the positive side in the Z-axis direction. For example, the "upper surface of a substrate" indicates a surface of the substrate on the positive side in the Z-axis direction.

In the following description, the lower surface of a certain configuration indicates a surface of the configuration on the negative side in the Z-axis direction.

In the following description, the left side surface of a certain configuration indicates a surface of the configuration on the negative side in the X-axis direction.

In the following description, the right side surface of a certain configuration indicates a surface of the configuration on the positive side in the X-axis direction.

1. Embodiment 1

FIGS. 1 to 8 illustrate a sensor module 100 according to Embodiment 1.

Figure 2:
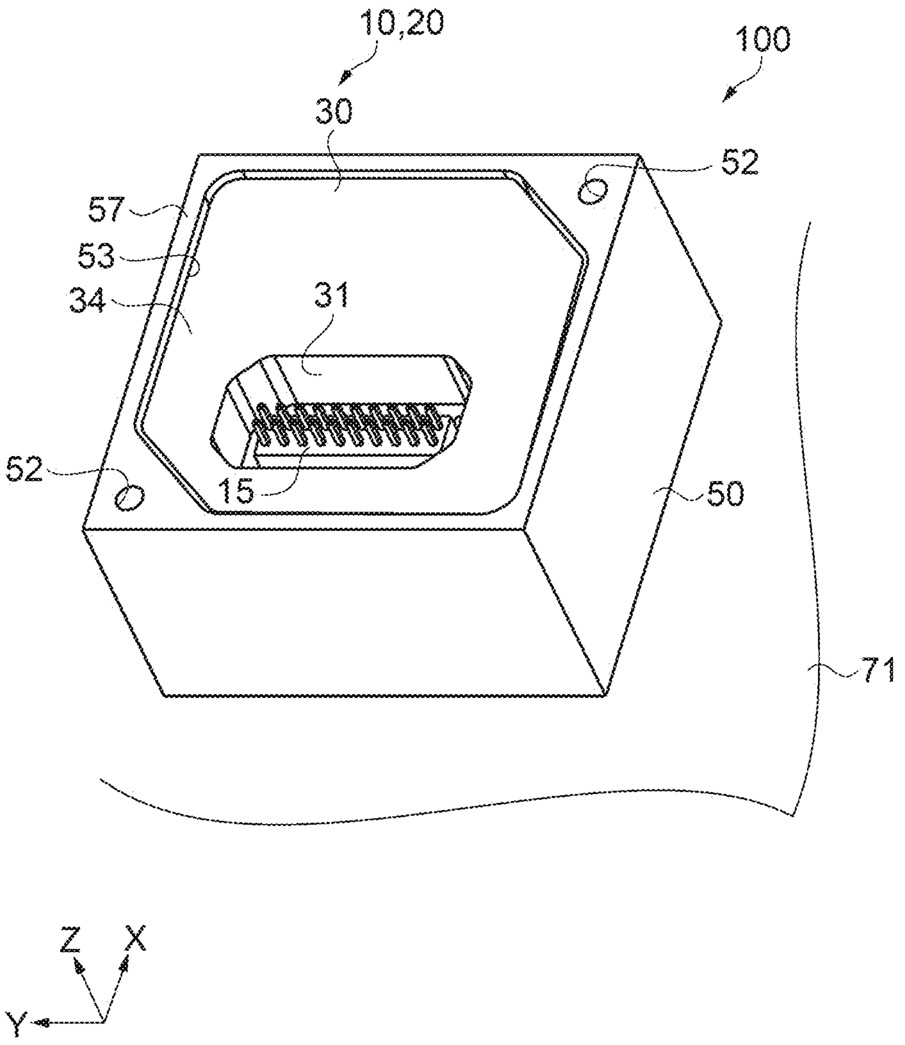
FIG. 2 is a perspective view illustrating the sensor module in FIG. 1 as viewed from a mounting surface side.
Figure 3:
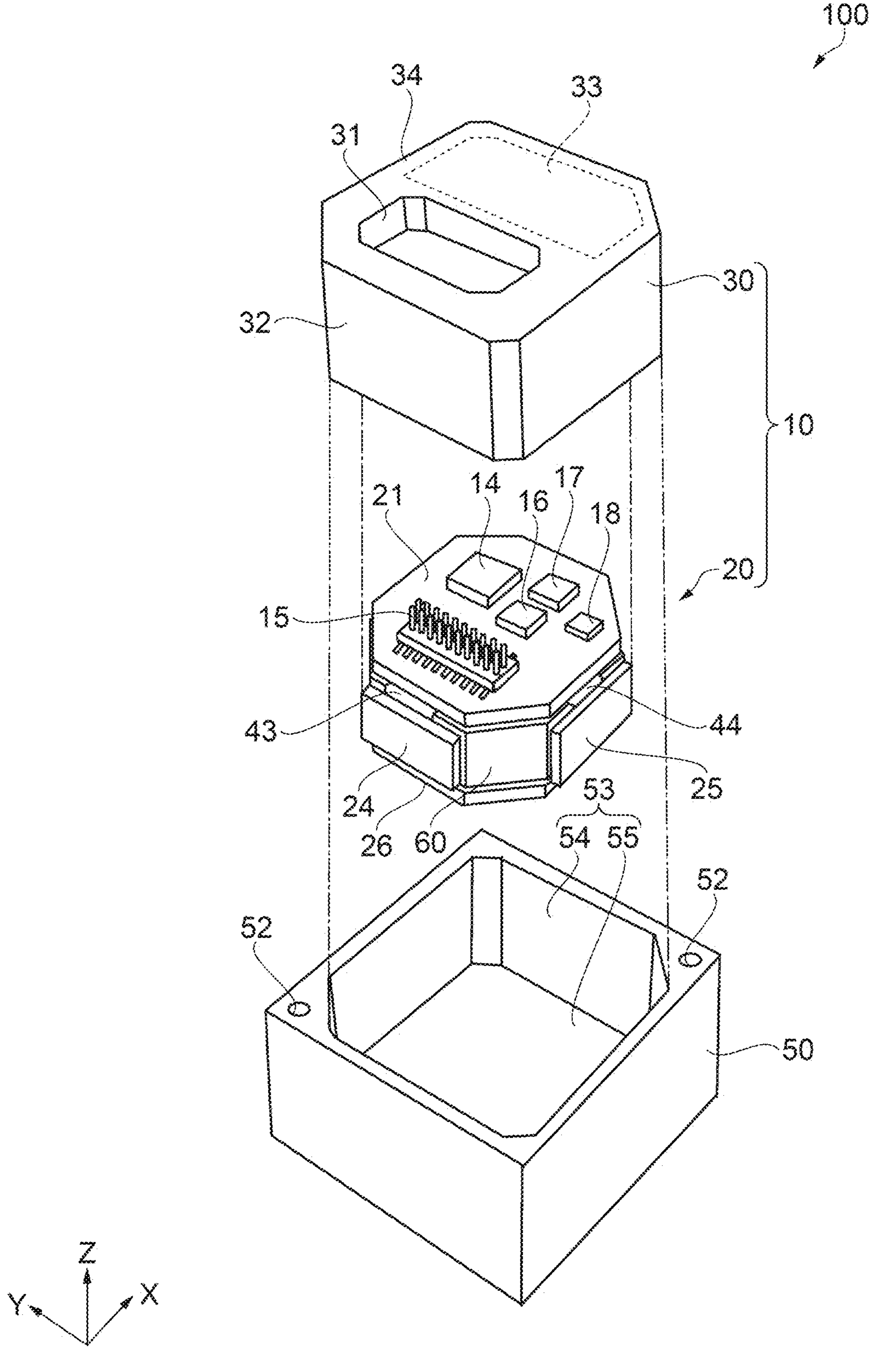
FIG. 3 is an exploded perspective view of the sensor module.
Figure 4:
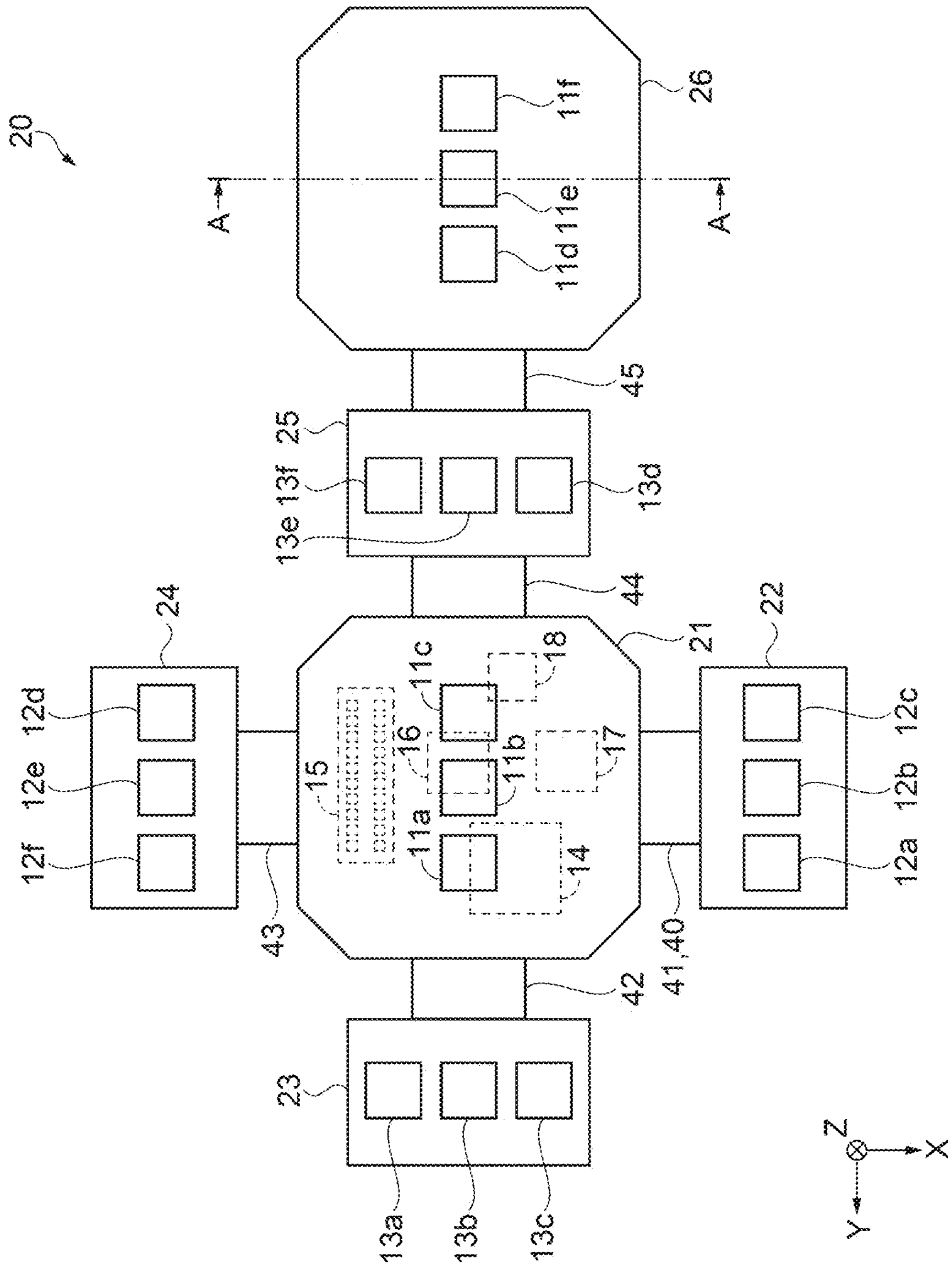
FIG. 4 is an exploded view of a substrate unit.
Figure 5:
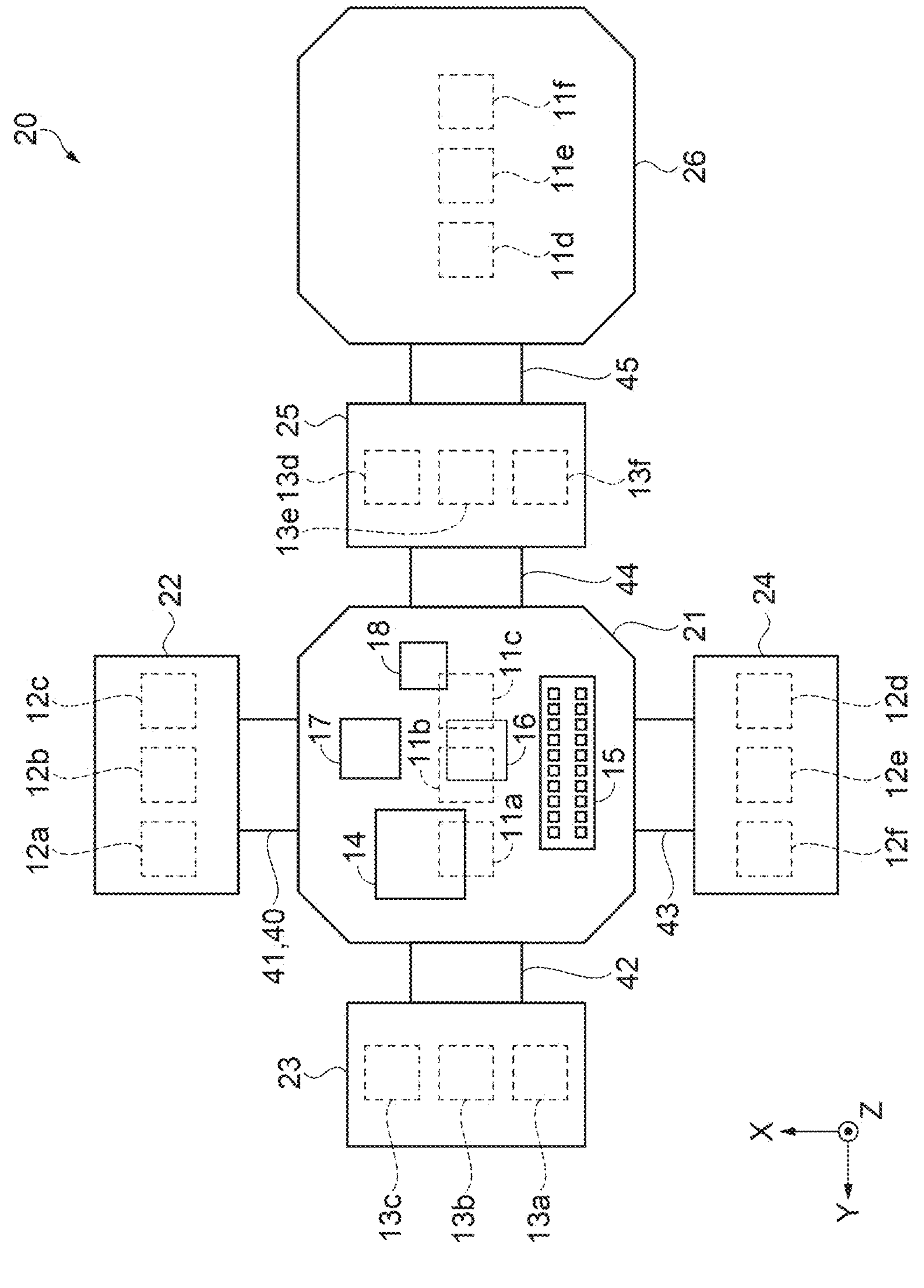
FIG. 5 is an exploded view of the substrate unit.
Figure 6:
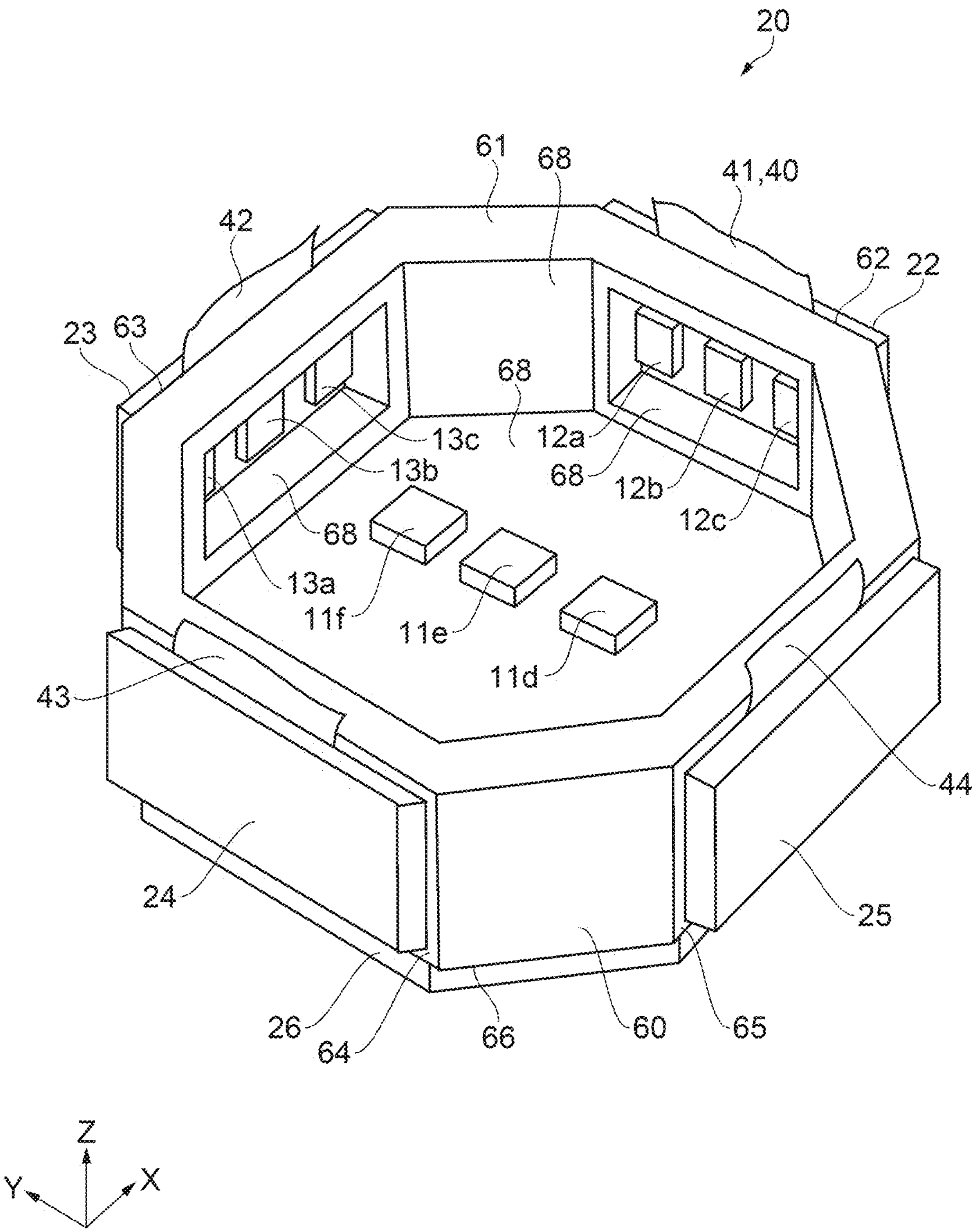
FIG. 6 is a perspective view of a fixing frame.
Figure 7A:
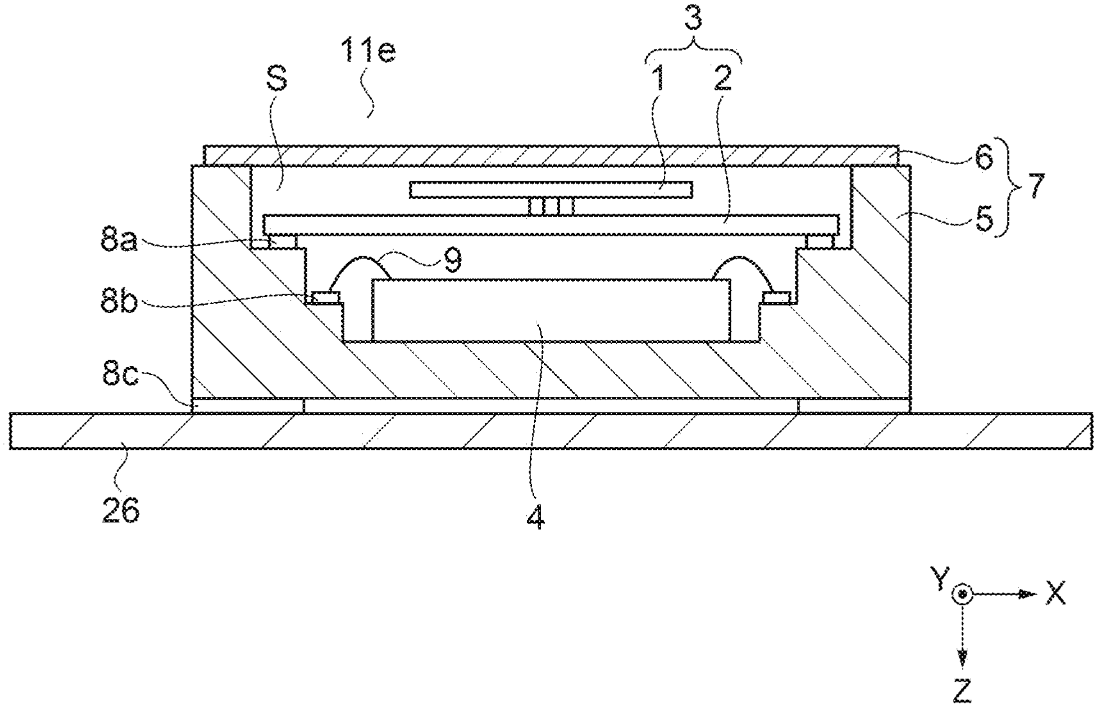
FIG. 7A is a cross-sectional view taken along a line A-A in FIG. 4.
Figure 7B:
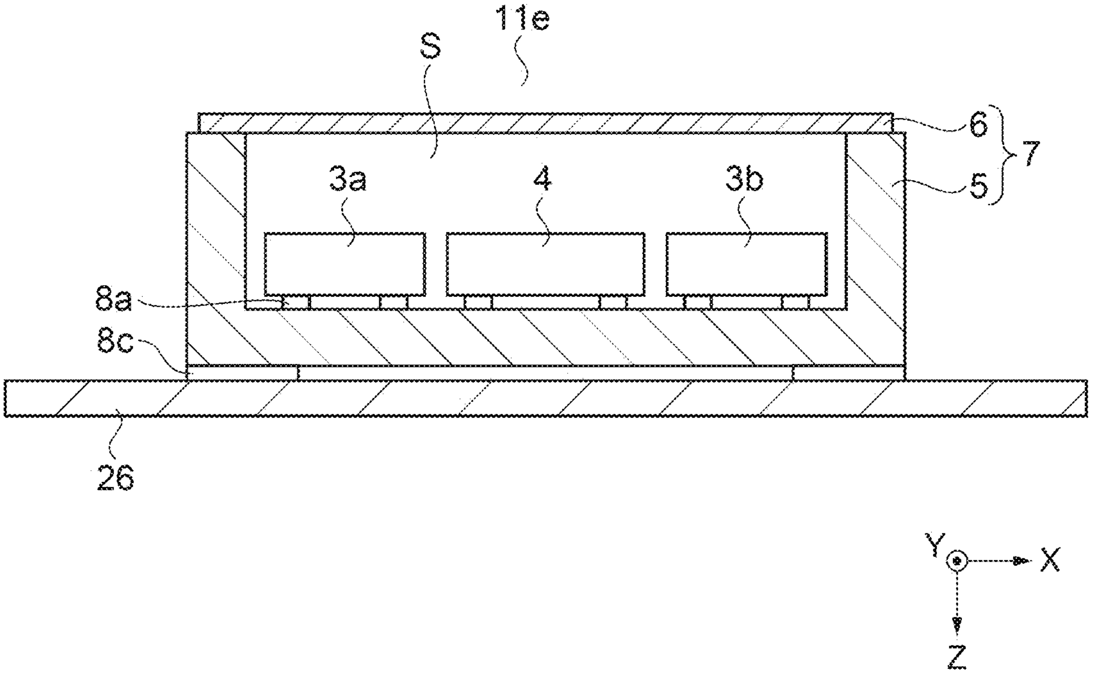
FIG. 7B is a cross-sectional view taken along the line A-A in FIG. 4.
Figure 8:
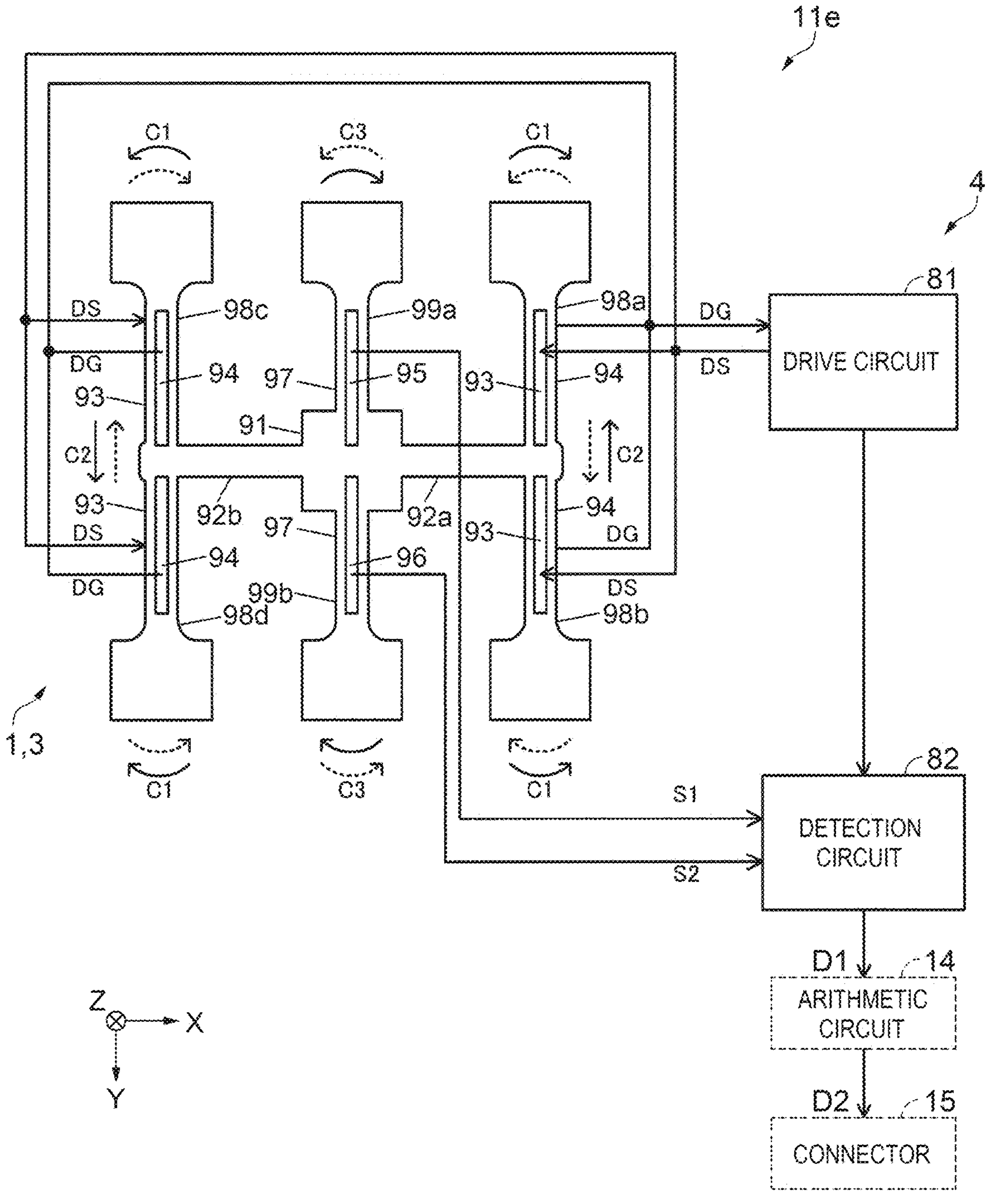
FIG. 8 is a configuration diagram of a sensor device.

FIG. 1 is a perspective view illustrating a state in which the sensor module 100 is fixed to a mounting surface 71 of an automatic vehicle or the like. FIG. 2 is a perspective view illustrating the sensor module 100 in FIG. 1 as viewed from a mounting surface 71 side. FIG. 3 is an exploded perspective view of the sensor module 100. FIG. 4 is an exploded view of a substrate unit 20. FIG. 5 is an exploded view of the substrate unit 20. FIG. 6 is a perspective view of a fixing frame 60. FIG. 7A is a cross-sectional view taken along a line A-A in FIG. 4, and illustrates an example of a sensor device 11*e*. FIG. 7B is a cross-sectional view taken along the line A-A in FIG. 4, and illustrates another example of the sensor device 11*e*. FIG. 8 is a diagram illustrating an internal configuration of the sensor device 11*e*.

In the present embodiment, the sensor module 100 is an inertial measurement unit (IMU) that detects a posture and behavior of a mounting device such as an automatic vehicle or a robot. Here, the mounting device can be rephrased as a moving body. The behavior can be rephrased as inertial momentum. Although a physical quantity detected by the sensor module 100 will be mainly described as being angular velocity or acceleration, the physical quantity is not limited to the angular velocity or acceleration, and may be other physical quantities such as velocity, pressure, displacement, posture, angle, or gravity.

As illustrated in FIG. 1, the sensor module 100 includes an outer case 50 that is substantially square in a plan view and rectangular in three dimensions. A size of the sensor module 100 is, for example, about 24 mm in length of one side of a square and about 10 mm in thickness.

The substrate unit 20 on which a plurality of sensor devices are mounted is housed in the outer case 50. The substrate unit 20 will be described later.

Screw holes 52 are formed at a lower surface 58 of the outer case 50. By passing screws 70 through the two screw holes 52, the sensor module 100 is fixed to the mounting surface 71 of the mounting device such as an automatic vehicle when in use.

As illustrated in FIG. 2, an inner case 30 is housed in an inner side 53 of an upper surface 57 of the outer case 50. An opening 31 is formed at an upper surface 34 of the inner case 30. A plug-type connector 15 is provided inside the opening 31.

The connector 15 includes a plurality of pins. A socket-type connector (not illustrated) is coupled to the connector 15 from the mounting device. The sensor module 100 is supplied with power from a power supply circuit of the mounting device via the connector 15, and transmits an electric signal such as detection data to the mounting device.

1.1. Configuration of Sensor Module

FIG. 3 is an exploded perspective view of the sensor module 100 illustrated in FIG. 2.

As illustrated in FIG. 3, the sensor module 100 includes the outer case 50 and a sensor unit 10 housed in the outer case 50. The sensor unit 10 includes the inner case 30 and the substrate unit 20 housed in the inner case 30.

The outer case 50 is a pedestal machined into a box shape from aluminum. The material is not limited to aluminum, and other metals such as zinc and stainless steel, resins, or composite materials of metals and resins may be used.

The outer case 50 has a box shape without a lid, and the inner side 53 thereof is an internal space surrounded by a bottom surface 55 and a side wall 54.

The sensor unit 10 is housed in the internal space of the outer case 50 via a joining member.

In the present embodiment, the outer case 50 and/or the inner case 30 is an example of a case.

The sensor unit 10 includes the inner case 30 and the substrate unit 20.

The inner case 30 is a member that holds the substrate unit 20 and is shaped to fit within the inner side 53 of the outer case 50. The inner case 30 is an octagon in a plan view with four corners of a square chamfered, and has the opening 31 which is a through hole formed at the upper surface thereof and a recess 33 formed at an inner side.

A height of a side wall 32 of the inner case 30 is smaller than a height of the side wall 54 of the outer case 50, and as illustrated in FIG. 2, the upper surface 34 of the inner case 30 is lower than the upper surface 57 of the outer case 50. Although not illustrated, a guide pin and a support surface for positioning the substrate unit 20 are formed at the inner side of the inner case 30.

The substrate unit 20 is positioned by the guide pin and the support surface, and is fixed to the inner side of the inner case 30 by a joining member.

1.2. Configuration of Substrate Unit

FIG. 4 is a plan view of the substrate unit 20 in an exploded state, as viewed from the negative side in the Z-axis direction. FIG. 5 is a plan view of the substrate unit 20 in the exploded state, as viewed from the positive side in the Z-axis direction.

As illustrated in FIGS. 3 and 6, the substrate unit 20 is used in an assembled state. In the present embodiment, the substrate unit 20 is supported by the fixing frame 60 and assembled into a substantially rectangular parallelepiped shape.

As illustrated in FIGS. 4 and 5, in the present embodiment, the substrate unit 20 includes substrates 21, 22, 23, 24, 25, and 26, flexible substrates 41, 42, 43, 44, and 45, sensor devices 11*a*, 11*b*, 11*c*, 11*d*, 11*e*, 11*f*, 12*a*, 12*b*, 12*c*, 12*d*, 12*e*, 12*f*, 13*a*, 13*b*, 13*c*, 13*d*, 13*e*, and 13*f*, an arithmetic circuit 14, the connector 15, a memory 16, a power supply circuit 17, and a temperature sensor 18.

The substrates 21, 22, 23, 24, 25, and 26 are a hard substrate called a rigid substrate, and specifically, a glass epoxy substrate. The substrates 21, 22, 23, 24, 25, and 26 may be a rigid substrate such as a composite substrate or ceramic substrate. The substrates 21, 22, 23, 24, 25, and 26 may have a multilayer structure or a single-layer structure.

The flexible substrates 41, 42, 43, 44, and 45 are substrates softer than the substrates 21, 22, 23, 24, 25, and 26. The flexible substrates 41, 42, 43, 44, and 45 may be a flexible wiring cable, wiring cord, or wire, such as a flat cable or a flat cord. The flexible substrates 41, 42, 43, 44, and 45 may each include a connector, solder, a conductive adhesive, or a crimping terminal.

In the present embodiment, the flexible substrate 41 is an example of a coupling portion 40 and a first coupling portion, the flexible substrate 42 is an example of a second coupling portion, the flexible substrate 43 is an example of a third coupling portion, and the flexible substrate 44 is an example of a fourth coupling portion.

The flexible substrate 41 electrically couples the substrate 21 and the substrate 22. The flexible substrate 42 electrically couples the substrate 21 and the substrate 23. The flexible substrate 43 electrically couples the substrate 21 and the substrate 24. The flexible substrate 44 electrically couples the substrate 21 and the substrate 25. The flexible substrate 45 electrically couples the substrate 25 and the substrate 26. The substrate 26 is electrically coupled to the substrate 21 via the flexible substrate 45, the substrate 25, and the flexible substrate 44.

The substrates 21, 22, 23, 24, 25, and 26 and the flexible substrates 41, 42, 43, 44, and 45 may be a rigid flexible substrate having a plurality of rigid portions and a plurality of flexible portions. When a rigid flexible substrate is adopted, the plurality of rigid portions correspond to the substrates 21, 22, 23, 24, 25, and 26 of the present embodiment, respectively, and the plurality of flexible portions correspond to the flexible substrates 41, 42, 43, 44, and 45 of the present embodiment, respectively.

The sensor devices 11*a*, 11*b*, 11*c*, 11*d*, 11*e*, 11*f*, 12*a*, 12*b*, 12*c*, 12*d*, 12*e*, 12*f*, 13*a*, 13*b*, 13*c*, 13*d*, 13*e*, and 13*f* are each angular velocity sensors. Specifically, the sensor devices 11*a*, 11*b*, 11*c*, 11*d*, 11*e*, 11*f*, 12*a*, 12*b*, 12*c*, 12*d*, 12*e*, 12*f*, 13*a*, 13*b*, 13*c*, 13*d*, 13*e*, and 13*f* are a vibrating gyro sensor that uses quartz crystal as a resonator and detects an angular velocity from a Coriolis force applied to the resonator. The resonator is not limited to quartz crystal. For example, the resonator may be a micro electro mechanical system (MEMS) resonator formed using a silicon substrate.

As illustrated in FIG. 4, the sensor devices 11*a*, 11*b*, and 11*c* are mounted on a lower surface of the substrate 21. The sensor devices 11*a*, 11*b*, and 11*c* are each Z-axis angular velocity sensors that detect an angular velocity around the Z axis. Drive frequencies of the resonators of the sensor devices 11*a*, 11*b*, and 11*c* are different from one another. In the present embodiment, the drive frequency of the resonator is an example of the drive frequency of the sensor device. The drive frequency of the resonator will be described in detail in section 1.4.3. below.

The sensor devices 12*a*, 12*b*, and 12*c* are mounted on the substrate 22. The sensor devices 12*a*, 12*b*, and 12*c* are each X-axis angular velocity sensors that detect an angular velocity around the X axis. The drive frequencies of the resonators of the sensor devices 12*a*, 12*b*, and 12*c* are different from one another.

The sensor devices 13*a*, 13*b*, and 13*c* are mounted on the substrate 23. The sensor devices 13*a*, 13*b*, and 13*c* are each Y-axis angular velocity sensors that detect an angular velocity around the Y axis. The drive frequencies of the resonators of the sensor devices 13*a*, 13*b*, and 13*c* are different from one another.

The sensor devices 12*d*, 12*e*, and 12*f* are mounted on the substrate 24. The sensor devices 12*d*, 12*e*, and 12*f* are each X-axis angular velocity sensors that detect the angular velocity around the X axis. The drive frequencies of the resonators of the sensor devices 12*d*, 12*e*, and 12*f* are different from one another.

The sensor devices 13*d*, 13*e*, and 13*f* are mounted on the substrate 25. The sensor devices 13*d*, 13*e*, and 13*f* are each Y-axis angular velocity sensors that detect the angular velocity around the Y axis. The drive frequencies of the resonators of the sensor devices 13*d*, 13*e*, and 13*f* are different from one another.

The sensor devices 11*d*, 11*e*, and 11*f* are mounted on the substrate 26. The sensor devices 11*d*, 11*e*, and 11*f* are each Z-axis angular velocity sensors that detect the angular velocity around the Z axis. The drive frequencies of the resonators of the sensor devices 11*d*, 11*e*, and 11*f* are different from one another.

In the present embodiment, the sensor module 100 includes six X-axis angular velocity sensors, six Y-axis angular velocity sensors, and six Z-axis angular velocity sensors. As described above, according to the configuration in which six angular velocity sensors are provided for each of the X, Y, and Z axes, the arithmetic circuit 14 calculates, based on angular velocity data from the six angular velocity sensors for each of the X, Y, and Z axes, for example, an average value, which is a statistical amount of the angular velocity data, thereby achieving high accuracy of angular velocity data for each axis.

The number of angular velocity sensors for each axis is not limited to six. Two or more angular velocity sensors are required for each axis, but six angular velocity sensors for each axis can improve the accuracy of the angular velocity data for each axis more than two.

The number of angular velocity sensors for each axis may be different. For example, the number of Z-axis angular velocity sensors may be six, the number of X-axis angular velocity sensors may be three, and the number of Y-axis angular velocity sensors may be three.

In the present embodiment, the six X-axis angular velocity sensors, the six Y-axis angular velocity sensors, and the six Z-axis angular velocity sensors are each divided into three angular velocity sensors each and mounted on two substrates respectively. Accordingly, according to the present embodiment, a limited space within the inner case 30 can be efficiently utilized to mount the angular velocity sensors for each axis, and the sensor module 100 can be easily reduced in size.

When there are three angular velocity sensors for each axis, the angular velocity sensors may be divided into one angular velocity sensor and two angular velocity sensors and mounted on two substrates respectively. Similarly, when there are four angular velocity sensors for each axis, the angular velocity sensors may be divided into two angular velocity sensors each and mounted on two substrates respectively. Similarly, when there are five angular velocity sensors for each axis, the angular velocity sensors may be divided into two angular velocity sensors and three angular velocity sensors and mounted on two substrates respectively, or may be divided into one angular velocity sensor and four angular velocity sensors and mounted on two substrates respectively. Similarly, when there are seven or more angular velocity sensors for each axis, the angular velocity sensors may be divided and mounted. The number of substrates is not limited to two, and the angular velocity sensors for each axis may be divided and mounted on three or more substrates.

In the present embodiment, the three Z-axis angular velocity sensors mounted on one substrate each have a different drive frequency. Accordingly, the three Z-axis angular velocity sensors mounted on one substrate can be prevented from mechanically and/or electrically interfering with one another. Therefore, effectiveness of high accuracy of angular velocity data around the Z axis can be improved.

Similarly, when two or four or more Z-axis angular velocity sensors are mounted on one substrate, the plurality of Z-axis angular velocity sensors mounted on one substrate may each have a different drive frequency.

The same applies to the case of three X-axis angular velocity sensors mounted on one substrate and the case of three Y-axis angular velocity sensors mounted on one substrate.

In the present embodiment, the drive frequency of the sensor device 11*a* on the substrate 21 and the drive frequency of the sensor device 11*d* on the substrate 26 are the same, for example, 49.6 kHz. The drive frequency of the sensor device 11*b* on the substrate 21 and the drive frequency of the sensor device 11*e* on the substrate 26 are the same, for example, 51.1 kHz. The drive frequency of the sensor device 11*c* on the substrate 21 and the drive frequency of the sensor device 11*f* on the substrate 26 are the same, for example, 53.6 kHz.

Accordingly, in the sensor module 100 of the present embodiment, it is not necessary to prepare six Z-axis angular velocity sensors each having a different drive frequency. Accordingly, in the sensor module 100 of the present embodiment, a cost required for preparing six Z-axis angular velocity sensors each having a different drive frequency, such as a cost required for manufacturing, ordering, inventory, or assembly can be reduced, and industrial utility value can be improved.

As illustrated in FIG. 5, the arithmetic circuit 14, the connector 15, the memory 16, the power supply circuit 17, and the temperature sensor 18 are mounted on an upper surface of the substrate 21. Other electronic components may be mounted on the upper surface of the substrate 21.

The arithmetic circuit 14 is a primary controller for the sensor devices 11*a*, 11*b*, 11*c*, 11*d*, 11*e*, 11*f*, 12*a*, 12*b*, 12*c*, 12*d*, 12*e*, 12*f*, 13*a*, 13*b*, 13*c*, 13*d*, 13*e*, and 13*f*. The arithmetic circuit 14 is an integrated circuit device, and can be implemented by a processor such as a micro processor unit (MPU) or a central processing unit (CPU).

The arithmetic circuit 14 includes a digital interface. The digital interface is a circuit that performs digital interface processing based on a communication standard such as SPI or I2C.

The arithmetic circuit 14 receives detection data output from the sensor devices 11*a*, 11*b*, 11*c*, 11*d*, 11*e*, 11*f*, 12*a*, 12*b*, 12*c*, 12*d*, 12*e*, 12*f*, 13*a*, 13*b*, 13*c*, 13*d*, 13*e*, and 13*f*, performs various types of processing, and transmits the processed detection data to the outside via the connector 15. In the present embodiment, the arithmetic circuit 14 is an example of a processing unit.

The various types of processing performed by the arithmetic circuit 14 include processing for calculating an average value of the detection data of the angular velocity around the Z axis from the sensor devices 11*a*, 11*b*, 11*c*, 11*d*, 11*e*, and 11*f*, processing for calculating an average value of the detection data of the angular velocity around the X axis from the sensor devices 12*a*, 12*b*, 12*c*, 12*d*, 12*e*, and 12*f*, processing for calculating an average value of the detection data of the angular velocity around the Y axis from the sensor devices 13*a*, 13*b*, 13*c*, 13*d*, 13*e*, and 13*f*, processing for performing temperature correction, zero point correction, and the like on the calculated average values, sensitivity adjustment processing, filter processing, processing for outputting the processed data from the connector 15, and the like.

The connector 15 is a plug-type connector and includes two rows of coupling terminals provided at equal pitches in the Y-axis direction. In the present embodiment, the connector 15 has 10 pins in one row, for a total of 20 pins coupling terminals, but the number of terminals may be appropriately changed according to design specifications.

The memory 16 stores a program for executing various types of processing performed by the arithmetic circuit 14, a program for incorporating processed detection data into packet data, and data required for executing the program, for example, table data used for temperature correction processing.

The power supply circuit 17 is supplied with power from the mounting device, and supplies necessary power to each sensor device, the arithmetic circuit 14, and the like.

The temperature sensor 18 outputs, to the arithmetic circuit 14, temperature information used for temperature correction processing.

1.3. Fixing Frame

FIG. 6 is a perspective view of the fixing frame 60, illustrating the fixing frame 60 with the substrate unit 20 attached thereto. In FIG. 6, the substrate 21 is omitted for description.

The fixing frame 60 has an octagonal cylindrical shape in a plan view, and openings 68 are provided in portions where the substrates 21, 22, 23, 24, 25, and 26 are attached. The openings 68 function as escapes of the sensor devices 11*a*, 11*b*, 11*c*, 11*d*, 11*e*, 11*f*, 12*a*, 12*b*, 12*c*, 12*d*, 12*e*, 12*f*, 13*a*, 13*b*, 13*c*, 13*d*, 13*e*, and 13*f*.

The substrates 21, 22, 23, 24, 25, and 26 are attached to the fixing frame 60 such that the sensor devices to be mounted thereon are on the inner side. Accordingly, since the sensor devices to be mounted do not protrude the outer side, a size of the substrate unit 20 can be reduced, and the sensor module 100 can be reduced in size.

The fixing frame 60 is formed of, for example, resin.

An elastic modulus of the fixing frame 60 is preferably smaller than those of the substrates 21, 22, 23, 24, 25, and 26 and larger than those of the flexible substrates 41, 42, 43, 44, and 45.

By making the elastic modulus of the fixing frame 60 smaller than those of the substrates 21, 22, 23, 24, 25, and 26, mechanical or electrical interference that occurs when the sensor devices 11*a*, 11*b*, 11*c*, 11*d*, 11*e*, 11*f*, 12*a*, 12*b*, 12*c*, 12*d*, 12*e*, 12*f*, 13*a*, 13*b*, 13*c*, 13*d*, 13*e*, and 13*f* are operated simultaneously can be prevented.

By making the elastic modulus of the fixing frame 60 larger than those of the flexible substrates 41, 42, 43, 44, and 45, the substrates 21, 22, 23, 24, 25, and 26 can be fixed at desired positions corresponding to detection axes of the sensor devices to be mounted, and deviation from the desired positions can be prevented.

The substrate 21 (not illustrated) is fixed to an upper surface 61 of the fixing frame 60, and the substrate 26 is fixed to a lower surface 66 of the fixing frame 60. In other words, the substrate 21 on which the sensor devices 11*a*, 11*b*, and 11*c* that detect the angular velocity around the Z axis are mounted and the substrate 26 on which the sensor devices 11*d*, 11*e*, and 11*f* are mounted are provided to face each other.

The substrate 22 is fixed to a side surface 62 of the fixing frame 60, and the substrate 24 is fixed to a side surface 64 of the fixing frame 60. In other words, the substrate 22 on which the sensor devices 12*a*, 12*b*, and 12*c* that detect the angular velocity around the X axis are mounted and the substrate 24 on which the sensor devices 12*d*, 12*e*, and 12*f* are mounted are provided to face each other.

The substrate 23 is fixed to a side surface 63 of the fixing frame 60, and the substrate 25 is fixed to a side surface 65 of the fixing frame 60. In other words, the substrate 23 on which the sensor devices 13*a*, 13*b*, and 13*c* that detect the angular velocity around the Y axis are mounted and the substrate 25 on which the sensor devices 13*d*, 13*e*, and 13*f* are mounted are provided to face each other.

In the present embodiment, the substrate unit 20 is fixed to the fixing frame 60 when being assembled, but the substrate unit 20 is not limited to a configuration using the fixing frame 60. For example, the substrate unit 20 may be directly fixed to the inner case 30 without using the fixing frame 60.

1.4. Sensor Device 1.4.1. Packaging

FIGS. 7A and 7B are cross-sectional views illustrating packaging of the sensor device 11*e*.

In the present embodiment, the sensor device 11*e* in FIG. 7A is a physical quantity sensor that detects an angular velocity with the Z axis as a detection axis. The sensor device 11*e* in FIG. 7B is a composite-type physical quantity sensor that detects an angular velocity with the Z axis as a detection axis and acceleration with the Z axis as a detection axis.

As illustrated in FIGS. 7A and 7B, the sensor device 11*e* includes a package 7, and a sensor element 3 and a circuit element 4, or sensor elements 3*a* and 3*b* and the circuit element 4, which are housed in the package 7. Although not illustrated, the sensor devices 11*a*, 11*b*, 11*c*, 11*d*, 11*f*, 12*a*, 12*b*, 12*c*, 12*d*, 12*e*, 12*f*, 13*a*, 13*b*, 13*c*, 13*d*, 13*e*, and 13*f* also have the same configuration as the sensor device 11*e*.

The package 7 includes a base 5 having a recess opened on an upper surface thereof, and a lid 6 bonded to the upper surface of the base 5 via a joining member so as to close an opening of the recess. An internal space S is formed inside the package 7 by the recess.

For example, the package 7 is a ceramic package. The base 5 is formed of ceramics such as alumina, and the lid 6 is formed of ceramics such as alumina or a metal material such as Kovar.

The sensor device 11*e* in FIG. 7A accommodates the sensor element 3 and the circuit element 4 in the internal space S. The sensor element 3 is an angular velocity sensor that detects an angular velocity around the Z axis, and includes a resonator 1 and a support substrate 2. The resonator 1 is a quartz crystal resonator. The circuit element 4 includes a detection circuit to be described later.

The internal space S is airtight and in a depressurized state, and is preferably in a state closer to vacuum. Accordingly, vibration characteristics of the resonator 1 is improved. The atmosphere of the internal space S is not particularly limited.

In the internal space S, the resonator 1, the support substrate 2, and the circuit element 4 are provided to overlap each other in a plan view. Such a configuration can prevent expansion of a plane area of the package 7 in directions along the X axis and/or Y axis, which is advantageous for reducing in size.

A plurality of internal terminals 8*a* and 8*b* are provided in the recess of the base 5, and a plurality of external terminals 8*c* are provided on a lower surface of the base 5.

The internal terminals 8*a* and 8*b* and the external terminals 8*c* are electrically coupled to interconnects (not illustrated) formed in the base 5 and at the substrate 26.

The internal terminal 8*a* is electrically coupled to the sensor element 3 via a conductive joining member, and the internal terminal 8*b* is electrically coupled to the circuit element 4 via a bonding wire 9.

The sensor device 11*e* in FIG. 7B accommodates the sensor elements 3*a* and 3*b* and the circuit element 4 in the internal space S.

The sensor element 3*a* is an angular velocity sensor that detects an angular velocity around the Z axis and includes a resonator that performs flexural vibration similar to the sensor element 3. The sensor element 3*a* detects an angular velocity using a Coriolis force.

The sensor element 3*b* is an acceleration sensor that detects acceleration in the Z-axis direction. The sensor element 3*b* includes a quartz crystal resonator, and detects acceleration by utilizing a change in vibration frequency of the quartz crystal resonator. The sensor element 3*b* may include a silicon MEMS having a comb-shaped fixed electrode and a comb-shaped movable electrode, and may be configured to detect acceleration using a change in capacitance formed therebetween.

The circuit element 4 includes a detection circuit to be described later.

In the embodiment illustrated in FIG. 7B, the sensor device 11*e* includes an angular velocity sensor that detects an angular velocity around the Z axis and an acceleration sensor that detects acceleration in the Z-axis direction, but the sensor device 11*e* is not limited to this configuration.

For example, the sensor device 11*e* may include, in addition to the sensor elements 3*a* and 3*b*, an angular velocity sensor element that detects an angular velocity around the X axis and/or an angular velocity sensor element that detects an angular velocity around the Y axis.

For example, the sensor device 11*e* may include, in addition to the sensor elements 3*a* and 3*b*, an acceleration sensor element that detects acceleration in the X-axis direction and/or an acceleration sensor element that detects acceleration in the Y-axis direction.

For example, the sensor element 3*a* may be a three-axis angular velocity sensor that detects angular velocities around each of the X, Y, and Z axes.

For example, the sensor element 3*b* may be a three-axis acceleration sensor that detects acceleration in each of the X-, Y-, and Z-axis directions.

For example, the sensor element 3*b* may be an angular velocity sensor that detects an angular velocity around the Y axis and/or the X axis, or a three-axis angular velocity sensor that detects angular velocities around each of the X, Y, and Z axes.

For example, the sensor element 3*a* may be a three-axis angular velocity sensor that detects angular velocities around each of the X, Y, and Z axes, and the sensor element 3*b* may be a three-axis acceleration sensor that detects acceleration in each of the X-, Y-, and Z-axis directions. In other words, the sensor device 11*e* may be a three-axis angular velocity sensor, a three-axis acceleration sensor, or a six degrees of freedom (6DoF) sensor.

When a ceramic package is used as the package 7, the package 7 can be rephrased as a hard substrate. In this case, the sensor elements 3, 3*a*, and 3*b* can be rephrased as the sensor device 11*e*.

When a ceramic package is used as the package 7, the package 7 may be directly mounted on the flexible substrate 45 without the substrate 26 being interposed therebetween.

1.4.2. Configuration of Sensor Element and Circuit Element

FIG. 8 shows a detailed configuration example of the sensor element 3 and the circuit element 4 of the sensor device 11*e* illustrated in FIG. 7A. The sensor devices 11*a*, 11*b*, 11*c*, 11*d*, 11*f*, 12*a*, 12*b*, 12*c*, 12*d*, 12*e*, 12*f*, 13*a*, 13*b*, 13*c*, 13*d*, 13*e*, and 13*f* also have the same configuration.

The sensor device 11*e* includes the sensor element 3 and the circuit element 4.

The sensor element 3 includes the resonator 1, and the circuit element 4 includes a drive circuit 81 and a detection circuit 82.

The drive circuit 81 includes an amplifier circuit that receives a feedback signal DG from the resonator 1 and amplifies the signal, an automatic gain control (AGC) circuit that performs automatic gain control, an output circuit that outputs a drive signal DS to the resonator 1, and the like. The AGC circuit variably and automatically adjusts a gain such that an amplitude of the feedback signal DG from the resonator 1 becomes constant. The output circuit outputs, for example, the square wave drive signal DS to the resonator 1.

The detection circuit 82 may include an amplifier circuit, a synchronous detection circuit, an A/D conversion circuit, and the like. The amplifier circuit receives detection signals S1 and S2 from the resonator 1 and performs charge-voltage conversion and signal amplification of the detection signals S1 and S2 which are differential signals. The synchronous detection circuit performs synchronous detection for extracting a desired wave using a synchronous signal from the drive circuit 81. The A/D conversion circuit converts the analog detection signals S1 and S2 after the synchronous detection into digital detection data D1 and outputs the digital detection data D1 to the arithmetic circuit 14. In the present embodiment, the detection data D1 is an example of a detection signal.

The arithmetic circuit 14 performs various types of processing such as temperature correction, zero point correction, sensitivity adjustment, and filter processing on the detection data D1, and outputs processed detection data D2 to the outside via the connector 15.

In the present embodiment, the resonator 1 has a double T-shaped structure. The resonator 1 may be a tuning fork type or H type resonator.

The resonator 1 includes drive arms 98*a*, 98*b*, 98*c*, and 98*d*, detection arms 99*a* and 99*b*, a base portion 91, and coupling arms 92*a* and 92*b*.

The base portion 91 has a rectangular shape, and the detection arm 99*a*, the detection arm 99*b*, the coupling arm 92*a*, and the coupling arm 92*b* are provided on sides of the base portion 91, respectively.

The drive arm 98*a* and the drive arm 98*b* are provided at a tip end portion of the coupling arm 92*a*.

The drive arm 98*c* and the drive arm 98*d* are provided at a tip end portion of the coupling arm 92*b*.

The drive arms 98*a*, 98*b*, 98*c*, and 98*d* and the detection arms 99*a* and 99*b* each have a weight portion at a tip end portion thereof for adjusting a frequency.

When the Z-axis direction is a thickness direction of the resonator 1, the resonator 1 detects an angular velocity around the Z axis.

Drive electrodes 93 are formed at upper surfaces and lower surfaces of the drive arms 98*a* and 98*b*. Drive electrodes 94 are formed at right side surfaces and left side surfaces of the drive arms 98*a* and 98*b*.

The drive electrodes 94 are formed at upper surfaces and lower surfaces of the drive arms 98*c* and 98*d*. The drive electrodes 93 are formed at right side surfaces and left side surfaces of the drive arms 98*c* and 98*d*.

The drive electrodes 93 and 94 are electrically coupled to the drive circuit 81. The drive circuit 81 supplies the drive signal DS to the drive electrode 93, and the feedback signal DG is input from the drive electrode 94.

Detection electrodes 95 are formed at an upper surface and a lower surface of the detection arm 99*a*. Ground electrodes 97 are formed at a right side surface and a left side surface of the detection arm 99*a*.

Detection electrodes 96 are formed at an upper surface and a lower surface of the detection arm 99*b*. The ground electrodes 97 are formed at a right side surface and a left side surface of the detection arm 99*b*.

The detection 95 and 96 are electrodes electrically coupled to the detection circuit 82. The detection signals S1 and S2 from the detection electrodes 95 and 96 are input to the detection circuit 82.

1.4.3. Operation of Sensor Element and Circuit Element

The sensor element 3 and the circuit element 4 operate as follows.

When the drive signal DS is applied from the drive circuit 81 to the drive electrode 93, the drive arms 98*a*, 98*b*, 98*c*, and 98*d* perform flexural vibration as indicated by an arrow C1 due to an inverse piezoelectric effect. Specifically, tip ends of the drive arm 98*a* and the drive arm 98*c* repeatedly approach and separate from each other, and tip ends of the drive arm 98*b* and the drive arm 98*d* also repeatedly approach and separate from each other.

In other words, the drive arms 98*a*, 98*b*, 98*c*, and 98*d* repeat a vibration mode indicated by the solid arrow C1 and a vibration mode indicated by the dotted arrow C1 at a predetermined frequency. The predetermined frequency is, for example, 49.6 kHz.

In the present embodiment, the frequency of the flexural vibration of the drive arms 98*a*, 98*b*, 98*c*, and 98*d* is an example of the drive frequency of the sensor device 11*e*. The frequency of the flexural vibration of the drive arms 98*a*, 98*b*, 98*c*, and 98*d* may be defined by a frequency of the drive signal DS. This is because the frequency of the drive signal DS has a correlation with the frequency of the flexural vibration of the drive arms 98*a*, 98*b*, 98*c*, and 98*d*. Similarly, the drive frequency of the sensor device 11*e* may be defined by another signal having a correlation with the frequency of the flexural vibration of the drive arms 98*a*, 98*b*, 98*c*, and 98*d*.

The flexural vibration of the drive arm 98*a* and the drive arm 98*b* and the flexural vibration of the drive arm 98*c* and the drive arm 98*d* are linearly symmetrical with respect to the Y axis passing through the center of gravity of the base portion 91. Accordingly, due to the flexural vibration of the drive arms 98*a*, 98*b*, 98*c*, and 98*d*, the base portion 91, the coupling arm 92*a*, the coupling arm 92*b*, the detection arm 99*a*, and the detection arm 99*b* hardly vibrate.

In this state, when an angular velocity with the Z axis as a rotation axis is applied to the resonator 1, the drive arms 98*a*, 98*b*, 98*c*, and 98*d* vibrate as indicated by an arrow C2 due to a Coriolis force. In other words, Coriolis forces in a direction of the arrow C1 and a direction of the arrow C2 perpendicular to the Z-axis direction act on the drive arms 98*a*, 98*b*, 98*c*, and 98*d*, thereby generating a vibration component in the direction of the arrow C2.

The vibration of the arrow C2 is transmitted to the base portion 91 via the coupling arm 92*a* and the coupling arm 92*b*, whereby the detection arm 99*a* and the detection arm 99*b* perform flexural vibration in a direction of an arrow C3.

A charge signal generated due to a piezoelectric effect caused by the flexural vibration of the detection arms 99*a* and 99*b* is input to the detection circuit 82 as the detection signals S1 and S2, and the angular velocity around the Z axis is detected.

As described above, the sensor module 100 of the present embodiment has the following effects.

The sensor module 100 of the present embodiment includes the substrate 21 as a first substrate, the substrate 22 as a second substrate, the coupling portion 40 that electrically couples the substrate 21 and the substrate 22, the sensor device 11*a* as a first sensor device provided on the substrate 21 and configured to detect an angular velocity around the Z axis as a physical quantity of a first axis, the sensor device 11*b* as a second sensor device provided on the substrate 21, configured to detect the angular velocity around the Z axis, and having a drive frequency different from that of the sensor device 11*a*, the sensor device 12*a* as a third sensor device provided on the substrate 22 and configured to detect an angular velocity around the X axis as a physical quantity of a second axis, and the sensor device 12*b* as a fourth sensor device provided on the substrate 22, configured to detect the angular velocity around the X axis, and having a drive frequency different from that of the sensor device 12*a*.

As described above, the sensor module 100 of the present embodiment includes the substrate 21 on which the sensor device 11*a* and the sensor device 11*b* that detect the angular velocity around the Z axis are mounted, and the substrate 22 on which the sensor device 12*a* and the sensor device 12*b* that detect the angular velocity around the X axis are mounted and which is coupled to the substrate 21 via the coupling portion 40, the drive frequency of the sensor device 11*a* is different from the drive frequency of the sensor device 11*b*, and the drive frequency of the sensor device 12*a* is different from the drive frequency of the sensor device 12*b*.

Accordingly, in the sensor module 100 of the present embodiment, the two angular velocity sensors around the Z axis that are mounted on the substrate 21 can be prevented from mechanically and/or electrically interfering with each other, and the two angular velocity sensors around the X axis that are mounted on the substrate 22 can be prevented from mechanically and/or electrically interfering with each other. Further, the two angular velocity sensors around the Z axis that are mounted on the substrate 21 and the two angular velocity sensors around the X axis that are mounted on the substrate 22 can be prevented from mechanically and/or electrically interfering with each other.

Therefore, in the sensor module 100 of the present embodiment, in the configuration including a plurality of angular velocity sensors around the Z axis and a plurality of angular velocity sensors around the X axis, the effectiveness of high accuracy of angular velocity data around each axis can be improved.

In other words, in the sensor module 100 of the present embodiment, by changing a combination of the two or more angular velocity sensors to be mounted on the substrate 21 and the two or more angular velocity sensors to be mounted on the substrate 22 to the X axis and Y axis, the Y axis and Z axis, or the Z axis and X axis, the effectiveness of high accuracy of the multi-axis angular velocity sensor can be improved. Further, in the sensor module 100 of the present embodiment, by replacing the angular velocity sensor with the acceleration sensor, the effectiveness of high accuracy of the multi-axis acceleration sensor can also be improved in the sensor module 100 of the present embodiment.

In the sensor module 100 of the present embodiment, the coupling portion 40 includes the flexible substrate 41.

As described above, in the sensor module 100 of the present embodiment, the substrate 21 and the substrate 22 are electrically coupled to each other via the flexible substrate 41.

The flexible substrate 41 is a soft substrate. Accordingly, in the sensor module 100 of the present embodiment, an occurrence of mechanical or electrical interference between the substrate 21 and the substrate 22 can be prevented. Therefore, in the sensor module 100 of the present embodiment, the effectiveness and reliability of high accuracy of the detection data can be improved.

The sensor module 100 of the present embodiment further includes the arithmetic circuit 14 as a processing unit provided on the substrate 21 and configured to process the detection data D1 as a first detection signal of the sensor device 11*a*, the detection data D1 as a second detection signal of the sensor device 11*b*, the detection data D1 as a third detection signal of the sensor device 12*a*, and the detection data D1 as a fourth detection signal of the sensor device 12*b*.

Accordingly, in the sensor module 100 of the present embodiment, the arithmetic circuit 14 processes, based on a configuration that ensures the effectiveness of high accuracy, each piece of detection data D1 detected by each sensor device. Accordingly, in the sensor module 100 of the present embodiment, the highly accurate and reliable detection data D2 can be obtained.

The sensor module 100 of the present embodiment further includes the connector 15 provided on the substrate 21 and electrically coupled to the arithmetic circuit 14.

Accordingly, the sensor module 100 of the present embodiment can output, based on the configuration that ensures the effectiveness of high accuracy, the highly accurate and reliable detection data D2 processed by the arithmetic circuit 14 to the outside via the connector 15.

The sensor module 100 of the present embodiment further includes the fixing frame 60 as a fixing portion configured to fix the substrate 21 and the substrate 22.

Thus, the substrate 21 and the substrate 22 are each fixed to the fixing frame 60 . . . . Accordingly, in the sensor module 100 of the present embodiment, the substrate 21 and the substrate 22 can be easily and reliably fixed. Therefore, in the sensor module 100 of the present embodiment, the effectiveness and reliability of high accuracy of the detection data can be improved.

The sensor module 100 of the present embodiment further includes the inner case 30 and the outer case 50 as a case that houses the substrate 21, the substrate 22, and the coupling portion 40.

As described above, since the substrate 21, the substrate 22, and the coupling portion 40 are housed in the inner case 30 and/or the outer case 50, external influences can be blocked, and the effectiveness and reliability of high accuracy of the detection data can be improved.

The sensor module 100 of the present embodiment includes the substrate 21 as a first substrate, the substrate 22 as a second substrate, the substrate 23 as a third substrate, and the flexible substrate 41 as a first coupling portion that electrically couples the substrate 21 and the substrate 22, the flexible substrate 42 as a second coupling portion that electrically couples the substrate 21 and the substrate 23, the sensor device 11*a* as a first sensor device provided on the substrate 21 and configured to detect an angular velocity around the Z axis as a physical quantity of a first axis, the sensor device 11*b* as a second sensor device provided on the substrate 21, configured to detect the angular velocity around the Z axis, and having a drive frequency different from that of the sensor device 11*a*, the sensor device 12*a* as a third sensor device provided on the substrate 22 and configured to detect an angular velocity around the X axis as a physical quantity of a second axis, the sensor device 12*b* as a fourth sensor device provided on the substrate 22, configured to detect the angular velocity around the X axis, and having a drive frequency different from that of the sensor device 12*a*, the sensor device 13*a* as a fifth sensor device provided on the substrate 23 and configured to detect an angular velocity around the Y axis as a physical quantity of a third axis, and the sensor device 13*b* as a sixth sensor device provided on the substrate 23, configured to detect the angular velocity around the Y axis, and having a drive frequency different from that of the sensor device 13*a*.

As described above, the sensor module 100 of the present embodiment includes the substrate 21 on which the sensor device 11*a* and the sensor device 11*b* that detect the angular velocity around the Z axis are mounted, the substrate 22 on which the sensor device 12*a* and the sensor device 12*b* that detect the angular velocity around the X axis are mounted and which is coupled to the substrate 21 via the flexible substrate 41, and the substrate 23 on which the sensor device 13*a* and the sensor device 13*b* that detect the angular velocity around the Y axis are mounted and which is coupled to the substrate 21 via the flexible substrate 42, the drive frequency of the sensor device 11*a* is different from the drive frequency of the sensor device 11*b*, the drive frequency of the sensor device 12*a* is different from the drive frequency of the sensor device 12$b$, and the drive frequency of the sensor device 13$a$ is different from the drive frequency of the sensor device 13$b$.

Accordingly, in the sensor module 100 of the present embodiment, the two angular velocity sensors around the Z axis that are mounted on the substrate 21 can be prevented from mechanically and/or electrically interfering with each other, the two angular velocity sensors around the X axis that are mounted on the substrate 22 can be prevented from mechanically and/or electrically interfering with each other, and the two angular velocity sensors around the Y axis that are mounted on the substrate 23 can be prevented from mechanically and/or electrically interfering with each other. Further, the two angular velocity sensors around the Z axis that are mounted on the substrate 21, the two angular velocity sensors around the X axis that are mounted on the substrate 22, and the two angular velocity sensors around the Y axis that are mounted on the substrate 23 can be prevented from mechanically and/or electrically interfering with each other.

Therefore, in the sensor module 100 of the present embodiment, in the configuration including a plurality of angular velocity sensors around each axis, the effectiveness of high accuracy of angular velocity data around each axis can be improved. In other words, in the sensor module of 100 the present embodiment, the effectiveness of high accuracy of the multi-axial angular velocity sensor can be improved. Further, in the sensor module 100 of the present embodiment, by replacing the angular velocity sensor with the acceleration sensor, the effectiveness of high accuracy of the multi-axis acceleration sensor can also be improved in the sensor module 100 of the present embodiment.

The sensor module 100 of the present embodiment further includes the substrate 24 as a fourth substrate, the substrate 25 as a fifth substrate, the substrate 26 as a sixth substrate, and the flexible substrate 43 as a third coupling portion that electrically couples the substrate 21 and the substrate 24, the flexible substrate 44 as a fourth coupling portion that electrically couples the substrate 21 and the substrate 25, the flexible substrate 45 as a fifth coupling portion that electrically couples the substrate 25 and the substrate 26, and the sensor device 12$d$ as a seventh sensor device provided on the substrate 24 and configured to detect the angular velocity around the X axis, the sensor device 12$e$ as an eighth sensor device provided on the substrate 24, configured to detect the angular velocity around the X axis, and having a drive frequency different from that of the sensor device 12$d$, and the sensor device 13$d$ as a ninth sensor device provided on the substrate 25 and configured to detect the angular velocity around the Y axis, the sensor device 13$e$ as a tenth sensor device provided on the substrate 25, configured to detect the angular velocity around the Y axis, and having a drive frequency different from that of the sensor device 13$d$, and the sensor device 11$d$ as an eleventh sensor device provided on the substrate 26 and configured to detect the angular velocity around the Z axis, and the sensor device 11$e$ as a twelfth sensor device provided on the substrate 26, configured to detect the angular velocity around the Z axis, and having a drive frequency different from that of the sensor device 11$d$.

As described above, the sensor module 100 of the present embodiment further includes the substrate 24 on which the sensor device 12$d$ and the sensor device 12$e$ that detect the angular velocity around the X axis are mounted and which is coupled to the substrate 21 via the flexible substrate 43, the substrate 25 on which the sensor device 13$d$ and the sensor device 13$e$ that detect the angular velocity around the Y axis are mounted and which is coupled to the substrate 21 via the flexible substrate 44, and the substrate 26 on which the sensor device 11$d$ and the sensor device 11$e$ that detect the angular velocity around the Z axis are mounted and which is coupled to the substrate 25 via the flexible substrate 45, the drive frequency of the sensor device 11$d$ is different from the drive frequency of the sensor device 11$e$, the drive frequency of the sensor device 12$d$ is different from the drive frequency of the sensor device 12$e$, and the drive frequency of the sensor device 13$d$ is different from the drive frequency of the sensor device 13$e$.

Accordingly, in the sensor module 100 of the present embodiment, further, the two angular velocity sensors around the X axis that are mounted on the substrate 24 can be prevented from mechanically and/or electrically interfering with each other, the two angular velocity sensors around the Y axis that are mounted on the substrate 25 can be prevented from mechanically and/or electrically interfering with each other, and the two angular velocity sensors around the Z axis that are mounted on the substrate 26 can be prevented from mechanically and/or electrically interfering with each other. In addition, the two angular velocity sensors around the Z axis that are mounted on the substrate 21, the two angular velocity sensors around the X axis that are mounted on the substrate 22, the two angular velocity sensors around the Y axis that are mounted on the substrate 23, the two angular velocity sensors around the X axis that are mounted on the substrate 24, the two angular velocity sensors around the Y axis that are mounted on the substrate 25, and the two angular velocity sensors around the Z axis that are mounted on the substrate 26 can be prevented from mechanically and/or electrically interfering with each other.

Therefore, in the sensor module 100 of the present embodiment, in the configuration including a plurality of angular velocity sensors around each axis, the effectiveness of high accuracy of angular velocity data around each axis can be improved. In other words, in the sensor module 100 of the present embodiment, the effectiveness of high accuracy of the multi-axial angular velocity sensor can be improved.

Further, in the sensor module 100 of the present embodiment, a plurality of X-axis angular velocity sensors, a plurality of Y-axis angular velocity sensors, and a plurality of Z-axis angular velocity sensors are each mounted on two substrates, respectively. Therefore, in the sensor module 100 of the present embodiment, the substrate can be reduced in size, which is advantageous for reducing in size of the sensor module 100.

Further, in the sensor module 100 of the present embodiment, by replacing the angular velocity sensor with the acceleration sensor, the effectiveness of high accuracy of the multi-axis acceleration sensor can also be improved in the sensor module 100 of the present embodiment.

The sensor module 100 of the present embodiment further includes the sensor device 11$c$ as a thirteenth sensor device provided on the substrate 21, configured to detect the angular velocity around the Z axis, and having a drive frequency different from those of the sensor device 11$a$ and the sensor device 11$b$, the sensor device 12$c$ as a fourteenth sensor device provided on the substrate 22, configured to detect the angular velocity around the X axis, and having a drive frequency different from those of the sensor device 12$a$ and the sensor device 12$b$, and the sensor device 13$c$ as a fifteenth sensor device provided on the substrate 23, configured to detect the angular velocity around the Y axis, and having a drive frequency different from those of the sensor device 13$a$ and the sensor device 13$b$. The sensor module 100 of the present embodiment further includes the sensor device 12*f* as a sixteenth sensor device provided on the substrate 24, configured to detect the angular velocity around the X axis, and having a drive frequency different from those of the sensor device 12*d* and the sensor device 12*e*, the sensor device 13*f* as a seventeenth sensor device provided on the substrate 25, configured to detect the angular velocity around the Y axis, and having a drive frequency different from those of the sensor device 13*d* and the sensor device 13*e*, and the sensor device 11*f* as an eighteenth sensor device provided on the substrate 26, configured to detect the angular velocity around the Z axis, and having a drive frequency different from those of the sensor device 11*d* and the sensor device 11*e*.

As described above, the sensor module 100 of the present embodiment includes the sensor devices 11*a*, 11*b*, and 11*c* that are provided on the substrate 21, detect the angular velocity around the Z axis, and each have a different drive frequency, the sensor devices 12*a*, 12*b*, and 12*c* that are provided on the substrate 22, detect the angular velocity around the X axis, and each have a different drive frequency, and the sensor devices 13*a*, 13*b*, and 13*c* that are provided on the substrate 23, detect the angular velocity around the Y axis, and each have a different drive frequency. The sensor module 100 of the present embodiment includes the sensor devices 12*d*, 12*e*, and 12*f* that are provided on the substrate 24, detect the angular velocity around the X axis, and each have a different drive frequency, the sensor devices 13*d*, 13*e*, and 13*f* that are provided on the substrate 25, detect the angular velocity around the Y axis, and each have a different drive frequency, and the sensor devices 11*d*, 11*e*, and 11*f* that are provided on the substrate 26, detect the angular velocity around the Z axis, and each have a different drive frequency.

Therefore, in the sensor module 100 of the present embodiment, in the configuration including a plurality of angular velocity sensors around each axis, the effectiveness of high accuracy of the angular velocity data around each axis can be improved. In other words, in the sensor module 100 of the present embodiment, the effectiveness of high accuracy of the multi-axial angular velocity sensor can be improved. Further, in the sensor module 100 of the present embodiment, by replacing the angular velocity sensor with the acceleration sensor, the effectiveness of high accuracy of the multi-axis acceleration sensor can also be improved in the sensor module 100 of the present embodiment.

In the sensor module 100 of the present embodiment, the drive frequency of the sensor device 11*a* and the drive frequency of the sensor device 11*d* are the same, the drive frequency of the sensor device 12*a* and the drive frequency of the sensor device 12*d* are the same, and the drive frequency of the sensor device 13*a* and the drive frequency of the sensor device 13*d* are the same.

Accordingly, in the sensor module 100 of the present embodiment, it is not necessary to prepare a plurality of angular velocity sensors for the same axis that all have different drive frequencies. Accordingly, in the sensor module 100 of the present embodiment, a cost required for preparing a plurality of angular velocity sensors for the same axis that all have different drive frequencies, such as a cost required for manufacturing, ordering, inventory, or assembling can be reduced, and industrial utility value can be improved.

2. Embodiment 2

In Embodiment 2, an electronic apparatus including the sensor module 100 will be described.

In the following, an example of the electronic apparatus will be described, including a mobile apparatus such as a smartphone and a vehicle such as an automatic vehicle.

2.1. Overview of Mobile Apparatus

Figure 9:
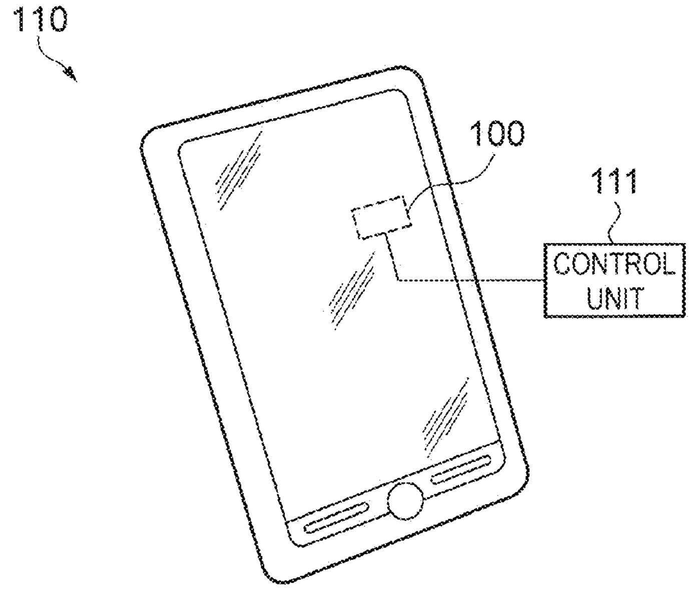
FIG. 9 is a perspective view illustrating an example of an electronic apparatus according to Embodiment 2.

FIG. 9 is a perspective view of a mobile apparatus as the electronic apparatus according to Embodiment 2, and is a diagram illustrating a configuration of a smartphone 110 as an example of the mobile apparatus.

The smartphone 110 includes the sensor module 100.

The detection data D2 of the sensor module 100 is received by a control unit 111. The control unit 111 can recognize a posture and behavior of the smartphone 110 based on the received detection signal, and change a display image displayed on a display unit, play a warning sound or a sound effect, or drive a vibration motor to vibrate the main body.

The sensor module 100 may be mounted on a mobile apparatus other than the smartphone 110. For example, the sensor module 100 may be mounted on a mobile apparatus such as a smart watch, a portable activity meter, a head mounted display (HMD), a mobile personal computer (PC), a tablet PC, a camera, or personal digital assistant (PDA). Accordingly, the mobile apparatus can recognize a posture and behavior of the mobile apparatus based on the detection data D2 of the sensor module 100, and change a display image, play a warning sound or a sound effect, or drive a vibration motor to vibrate the main body.

As described above, in the present embodiment, the sensor module 100 is mounted on a mobile apparatus such as the smartphone 110. Accordingly, according to the present embodiment, the reliability of the mobile apparatus including the sensor module 100 can be improved.

2.2. Overview of Vehicle

Figure 10:
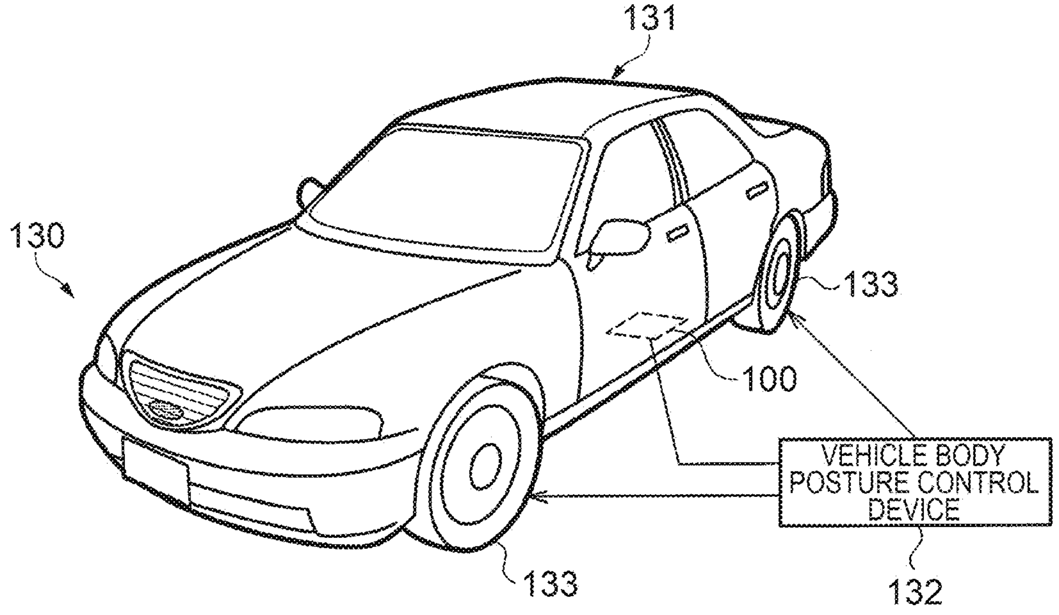
FIG. 10 is a perspective view illustrating another example of the electronic apparatus according to Embodiment 2.

FIG. 10 is a perspective view of a vehicle as the electronic apparatus according to Embodiment 2, and is a diagram illustrating a configuration of an automatic vehicle 130 as an example of the vehicle.

The automatic vehicle 130 is equipped with the sensor module 100.

The sensor module 100 detects a posture of a vehicle body 131 and transmits the detection data D2 to a vehicle body posture control device 132. The detection data D2 includes an angular velocity signal and an acceleration signal.

When receiving the detection data D2 from the sensor module 100, the vehicle body posture control device 132 that controls a posture of the vehicle body 131 detects the posture of the vehicle body 131 based on the signal, and controls hardness of a suspension or brakes of each wheel 133 according to a detection result.

The detection data D2 from the sensor module 100 may also be utilized in keyless entry, an immobilizer, a car navigation system, a car air conditioner, an anti-lock braking system (ABS), an airbag, a tire pressure monitoring system (TPMS), engine control, an inertial navigation control device for autonomous driving, an electronic control unit (ECU) such as a battery monitor for hybrid and electric vehicles, and the like.

The sensor module 100 may be mounted on a vehicle other than the automatic vehicle 130. The other vehicles are, for example, a bipedal robot, a train, a radio-controlled airplane, a radio-controlled helicopter, a drone, agricultural machinery, and construction machinery. The vehicle on which the sensor module 100 is mounted can utilize the detection data D2 from the sensor module 100 for posture control, position measurement, and the like of the vehicle.

As described above, in the present embodiment, the sensor module 100 is mounted on a vehicle such as the automatic vehicle 130. Accordingly, according to the present embodiment, the reliability of the vehicle including the sensor module 100 can be improved.

Although preferred embodiments have been described above, the present disclosure is not limited to the above-described embodiments. In addition, the configuration of each unit according to the present disclosure can be replaced with any configuration that exhibits the same function as that of the above-described embodiments, and any configuration can be added.

What is claimed is:

1. A sensor module comprising:

a first substrate;

a second substrate;

a coupling portion that electrically couples the first substrate and the second substrate;

a first sensor device provided on the first substrate and configured to detect a physical quantity of a first axis;

a second sensor device provided on the first substrate, configured to detect the physical quantity of the first axis, and having a drive frequency different from that of the first sensor device;

a third sensor device provided on the second substrate and configured to detect a physical quantity of a second axis; and a fourth sensor device provided on the second substrate, configured to detect the physical quantity of the second axis, and having a drive frequency different from that of the third sensor device.

2. The sensor module according to claim 1, wherein the coupling portion includes a flexible substrate.

3. The sensor module according to claim 1, further comprising:

a processing unit provided on the first substrate and configured to process a first detection signal of the first sensor device, a second detection signal of the second sensor device, a third detection signal of the third sensor device, and a fourth detection signal of the fourth sensor device.

4. The sensor module according to claim 3, further comprising:

a connector provided on the first substrate and electrically coupled to the processing unit.

5. The sensor module according to claim 1, further comprising:

a fixing portion configured to fix the first substrate and the second substrate.

6. The sensor module according to claim 1, further comprising:

a case that houses the first substrate, the second substrate, and the coupling portion.

7. The sensor module according to claim 1, further comprising:

a fifth sensor device provided on the first substrate, configured to detect the physical quantity of the first axis, and having a drive frequency different from those of the first sensor device and the second sensor device; and a sixth sensor device provided on the second substrate, configured to detect the physical quantity of the second axis, and having a drive frequency different from those of the third sensor device and the fourth sensor device.

8. An electronic apparatus comprising:

the sensor module according to claim 1.

9. A sensor module comprising:

a first substrate;

a second substrate;

a third substrate;

a first coupling portion that electrically couples the first substrate and the second substrate;

a second coupling portion that electrically couples the first substrate and the third substrate;

a first sensor device provided on the first substrate and configured to detect a physical quantity of a first axis;

a second sensor device provided on the first substrate, configured to detect the physical quantity of the first axis, and having a drive frequency different from that of the first sensor device;

a third sensor device provided on the second substrate and configured to detect a physical quantity of a second axis;

a fourth sensor device provided on the second substrate, configured to detect the physical quantity of the second axis, and having a drive frequency different from that of the third sensor device;

a fifth sensor device provided on the third substrate and configured to detect a physical quantity of a third axis; and a sixth sensor device provided on the third substrate, configured to detect the physical quantity of the third axis, and having a drive frequency different from that of the fifth sensor device.

10. The sensor module according to claim 9, further comprising:

a fourth substrate;

a fifth substrate;

a sixth substrate;

a third coupling portion that electrically couples the first substrate and the fourth substrate;

a fourth coupling portion that electrically couples the first substrate and the fifth substrate;

a fifth coupling portion that electrically couples the fifth substrate and the sixth substrate;

a seventh sensor device provided on the fourth substrate and configured to detect the physical quantity of the second axis;

an eighth sensor device provided on the fourth substrate, configured to detect the physical quantity of the second axis, and having a drive frequency different from that of the seventh sensor device;

a ninth sensor device provided on the fifth substrate and configured to detect the physical quantity of the third axis;

a tenth sensor device provided on the fifth substrate, configured to detect the physical quantity of the third axis, and having a drive frequency different from that of the ninth sensor device;

an eleventh sensor device provided on the sixth substrate and configured to detect the physical quantity of the first axis; and a twelfth sensor device provided on the sixth substrate, configured to detect the physical quantity of the first axis, and having a drive frequency different from that of the eleventh sensor device.

11. The sensor module according to claim 10, further comprising:

a thirteenth sensor device provided on the first substrate, configured to detect the physical quantity of the first axis, and having a drive frequency different from those of the first sensor device and the second sensor device;

a fourteenth sensor device provided on the second substrate, configured to detect the physical quantity of the second axis, and having a drive frequency different from those of the third sensor device and the fourth sensor device; and a fifteenth sensor device provided on the third substrate, configured to detect the physical quantity of the third axis, and having a drive frequency different from those of the fifth sensor device and the sixth sensor device.

12. The sensor module according to claim 11, further comprising:

a sixteenth sensor device provided on the fourth substrate, configured to detect the physical quantity of the second axis, and having a drive frequency different from those of the seventh sensor device and the eighth sensor device;

a seventeenth sensor device provided on the fifth substrate, configured to detect the physical quantity of the third axis, and having a drive frequency different from those of the ninth sensor device and the tenth sensor device; and an eighteenth sensor device provided on the sixth substrate, configured to detect the physical quantity of the first axis, and having a drive frequency different from those of the eleventh sensor device and the twelfth sensor device.

13. The sensor module according to claim 10, wherein the drive frequency of the first sensor device and the drive frequency of the eleventh sensor device are same, the drive frequency of the third sensor device and the drive frequency of the seventh sensor device are same, and the drive frequency of the fifth sensor device and the drive frequency of the ninth sensor device are same.

* * * * *